United States Patent
Chaplinsky

[19]

[11] Patent Number: 5,135,174

[45] Date of Patent: Aug. 4, 1992

[54] AUTOMATIC MICRO-FEEDING SYSTEM FOR APPLYING MULTIPLE INDEPENDENT PLANT NUTRIENTS TO IRRIGATION SYSTEMS

[76] Inventor: Michael J. Chaplinsky, 20611 Montview, Katy, Tex. 77450

[21] Appl. No.: 826,649

[22] Filed: Jan. 22, 1992

Related U.S. Application Data

[63] Continuation of Ser. No. 610,814, Nov. 8, 1990, abandoned.

[51] Int. Cl.⁵ .................. A01G 25/00; B05B 12/00
[52] U.S. Cl. ................................................. 239/310
[58] Field of Search .............. 239/310, 61, 68, 69

[56] References Cited

U.S. PATENT DOCUMENTS

| | | | |
|---|---|---|---|
| 3,770,198 | 11/1973 | Mihara | 239/310 |
| 4,324,294 | 4/1982 | McLoughlin et al. | 239/61 |
| 4,358,054 | 11/1982 | Ehrat | 239/61 |
| 4,545,396 | 10/1985 | Miller et al. | 239/310 |
| 4,588,127 | 5/1986 | Ehrat | 239/61 |
| 4,768,712 | 9/1988 | Terrell | 239/337 |
| 4,867,192 | 9/1989 | Terrell et al. | 239/69 |
| 4,895,303 | 1/1990 | Freyvogel | 239/310 |
| 4,913,089 | 4/1990 | Atkins et al. | 239/69 |
| 4,917,304 | 4/1990 | Mazzei et al. | 239/69 |
| 4,925,096 | 5/1990 | Gill | 239/61 |
| 5,004,155 | 4/1991 | Dashevsky | 239/310 |

Primary Examiner—Andres Kashnikow
Assistant Examiner—Lesley D. Morris
Attorney, Agent, or Firm—Pravel, Gambrell, Hewitt, Kimball & Krieger

[57] ABSTRACT

An automatic feeding system for applying multiple plant nutrients utilizing multiple nutrient pumps and a central mechanism to inject each nutrient individually into a flowing irrigation line during irrigation, allowing thereby for selecting the desired nutrient ratio by adjusting the output setting of each pump.

5 Claims, 1 Drawing Sheet

AUTOMATIC MICRO-FEEDING SYSTEM FOR APPLYING MULTIPLE INDEPENDENT PLANT NUTRIENTS TO IRRIGATION SYSTEMS

This is a continuation of co-pending application Ser. No. 07/610,814 filed on Nov. 8, 1990, now abandoned.

FIELD OF THE INVENTION

This invention relates to automatic feeding systems for applying multiple nutrients through an irrigation system.

BACKGROUND OF THE INVENTION

The modern golf course is maintained traditionally by irrigating, fertilizing, and mowing. The fertilization is commonly done by applying dry granular fertilizer and watering it in. During the year fertilizers of different ratios are applied as to the specific needs of the plant. Through the years liquid fertilizer has been applied to the course through the irrigation system by injecting it into the main line. This is a great labor saving practice for grounds keepers. This process uses a blended liquid fertilizer comprised of nitrogen, phosphorus, potassium, and micro-nutrients. These main nutrient elements are mixed into a recommended ration and applied to the course.

The quality blending of the liquid nutrients by the supplier is important to provide the needed nutrient ratios and to maintain storage life of the liquid. Some ratios are difficult to produce in liquid form and produce certain storage problems. Also the same nutrient ratio is injected on the entire course. In some cases different nutrients need to be added or eliminated to certain areas like the greens, tees, or fairways. Additionally, the user cannot change the fertilizer ratio until he has used the supply of nutrient in the storage tank and replaces it. These limitations prompted the design of this invention. The invention uses concentrated nitrogen, phosphorus, potassium, and micro-nutrients stored in individual tanks. This purity maximizes the storage life of the products. Each nutrient has its own injection pump and injection circuit to keep each nutrient separate until they are injected into the flowing main irrigation line. The desired nutrient ratio is obtained by setting the output rate of each injection pump. This is allowing an unlimited number of nutrient combinations with just four primary nutrients. These nutrient ratios can be changed as often as agronomic needs change for the plant. It also can be altered during the irrigation cycle to eliminate or add a specific nutrient to an area such as the greens, tees, or fairways.

The known prior art devices include those disclosed in U.S. Pat. Nos. 3,202,164, 3,421,738, 4,456,176 and 4,786,712. All these patents apply a premixed, blended single nutrient. They do not have the ability to alter the nutrient blend ratio of the stored nutrient.

This invention, which controls the independent injection of the four nutrients, will further reduce the use of chemical fertilizers by integrating plant tissue analyzing with the fertilizer program. This analyzing will evaluate the actual plant tissue nutrient needs based on each nutrient. With that determined the injection system can be adjusted to the exact nutrient ratio the plant requires and application will only apply what the plant will take up. This reduction of chemical fertilizers, and the minimizing of runoff, and leaching, will greatly improve the environment.

SUMMARY OF INVENTION the present invention provides an automatic apparatus to micro-feed independent liquid plant nutrients simultaneously by multi-injection into the irrigation system of a golf course and turf grass areas wherein the flow rate of the irrigation varies during the irrigation period. The system also provides the control of independent nutrients applied to specific areas such as, greens, tees, fairways, and roughs. This system also allows for changes in the application rates and the nutrient combinations as often as need to maintain optimum agronomic conditions while minimizing nutrient use. This practice of micro-feeding turf grass also provides for minimum fertilizer use to reduce runoff and leaching of fertilizers into streams and ground water to benefit the environment.

A flow sensor connected to the pipeline of the irrigation system measures the irrigation fluid flow rate and produces an irrigation fluid flow rate signal. A plurality of injection pumps with adjustable output flow rates connect a plurality of nutrient containers to the irrigation system. A control mechanism communicates with the irrigation system and injection pumps to adjust the output flow rate of each pump based on the irrigation fluid flow rate signal.

DESCRIPTION OF THE PREFERRED EMBODIMENT

Figure 1:
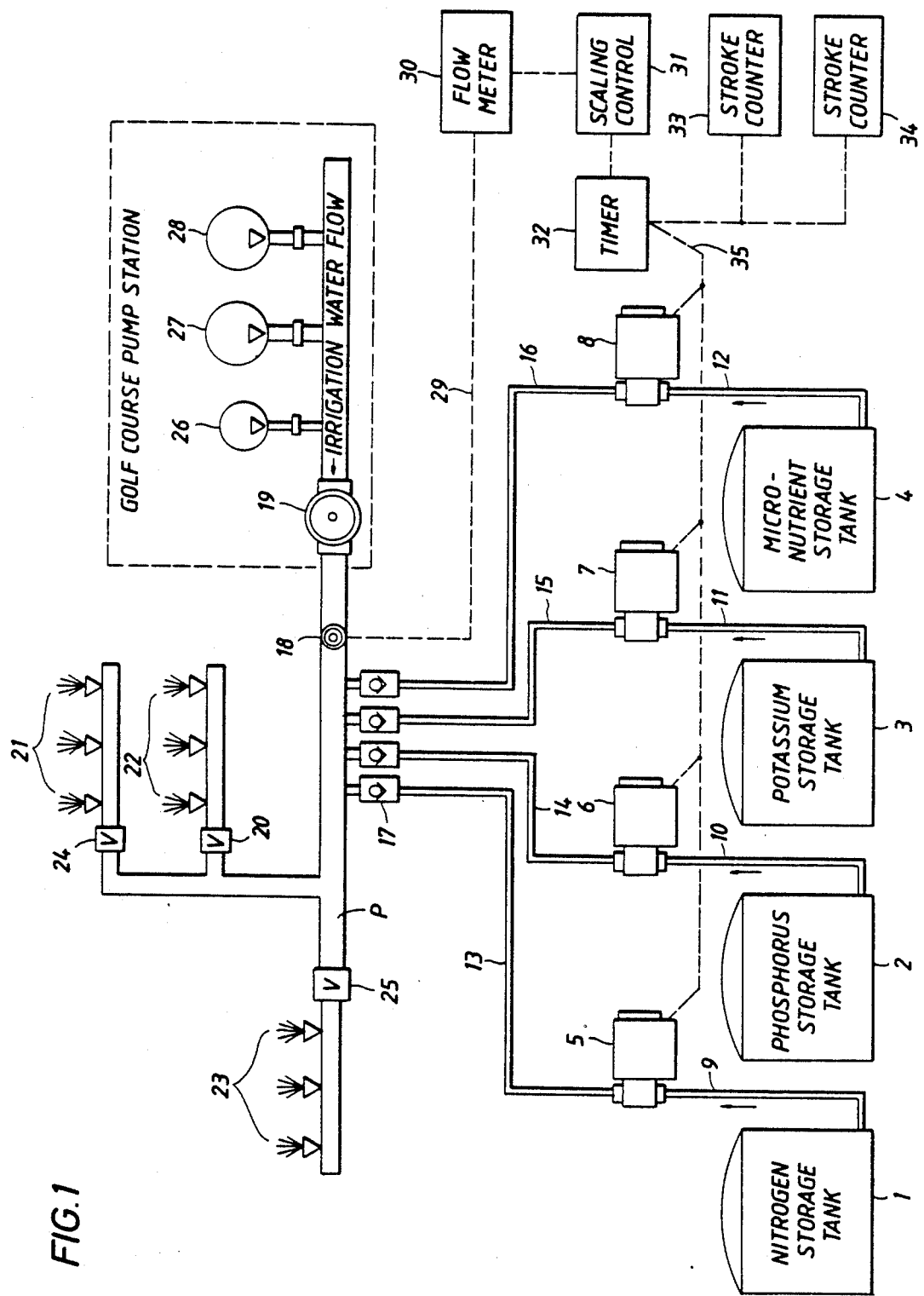
FIG. 1 is a diagram showing the elements of a typical irrigation system, showing various areas of irrigation and showing one embodiment of the inventory tanks, injection pumps, and electrical control components which comprise my invention.

The present apparatus includes four independent storage containers, nitrogen storage tank 1, phosphorus storage tank 2, potassium storage tank 3, and micro-nutrient storage tank 4, hereafter termed "Storage Tanks". The size of the tanks is preferably at least a 30 day supply of concentrated nutrient. Each tank contains an outlet foot valve and conduit 9, 10, 11, 12 to supply liquid nutrient to the suction input of each of the individual injection metering pumps 5, 6, 7, 8. Each injection metering pump is connected at the discharge output with a conduit 13, 14, 15, 16 which carries the liquid nutrient under high pressure to an injection lance and check valve 17 for each pump into the main irrigation P line. The injection point is located in the main line P directly down stream from the flow sensor 18 and pressure regulating valve 19 located on the pump station.

The pump station is presumed to be comprised of multiple pumps 26, 27, 28, which deliver varying flow rates of water to the irrigation system on demand. The pumps maintain a preset constant irrigation pressure controlled by the pressure regulating valve 19.

The typical irrigation system is a subsurface network of lines to supply pressurized water to irrigation control valves 25, 24, 20 for the different areas of the golf course, through which sprinklers apply water to areas such as the greens 21, tees 22, and fairways 23.

The flow sensor 18 which is in the main irrigation line P monitors the irrigation water as it starts, stops and varies in flow rate. This controls the pacing rate of the injection pumps 5, 6, 7, and 8. As the flow rate increases the pacing of the injection pumps, 5, 6, 7, and 8 increases proportional to the flow rate through the main line P. Thus the same injected parts per million of each nutrient as is maintained as the flow rate in the main line P varies. This is essential for even application to the turf areas. The electrical cable 29 transmits the electrical signal from the flow sensor 18 to the flow meter 30 which converts the signal into a display of the flow rate and a water totalizer. The signal is then transmitted to scaling controller 31, which interfaces the irrigation flow rate to maximum pump pacing rate. The scaling controller is connected to a multi-channel timer 32. Each channel is connected to a pump control cable 35 which controls the pacing rate of injection of each pump 5, 6, 7, 8. The pump pacing signal for each channel is sent to a stroke counter to total the stroke count of each channel. This is used to calculate the total volume of nutrient applied to the area.

It is important to understand that the invention, as presented, shows four independent; nutrient storage tanks, injector piping circuits, injection lance, injection check valve, and injection pumps. It is understood that if three nutrients are required in some applications, or more than four are required, that this system will perform in the same manner and will therefore have substantially the same benefits.

The operation of this system is divided into two sections; 1) the electrical control operation, 2) the nutrient injection operation. The description of the systems operation will so be presented in two sections.

THE ELECTRICAL CONTROL OPERATION

The main irrigation line just down stream from the pressure control valve 19 supplies the entire golf course irrigation system with water. In this line directly down stream from the control valve 19 is placed the flow sensor 18, which reads the flow of all water through the main line P that goes on to the golf course. As the irrigation system is started the flow at this point starts. The water demand of the irrigation will vary during a typical irrigation cycle so it is important to measure the flow rate. At the time the irrigation cycle is complete the flow will slow and stop. This flow sensor 18 will also be read on flow meter 30 any time the irrigation is used between irrigation cycles. As for example during watering or smaller independent water applications to the green, tees, or fairways. This enables all of the water in the irrigation lines to be nutrient treated to assure even application of the nutrients to the course. The flow sensor 18 sends the flow rate reading, which is an electrical signal, through cable 29 to the flow meter 30. This flow meter 30 is a display meter that converts the signal to a display of the flow rate in gallons per minute, and also the total gallons of water applied is displayed in a totalizer. The signal passes through the flow meter 30 and is sent to the scaling controller 31. The function of this is to take the flow signal and scale a contact output to operate at a rate not to exceed the maximum operating rate of the metering pumps. For example: If the irrigation is running at maximum flow rate the scaling controller is adjusted so as to operate the metering pumps at their maximum operating rate. This prevents over speeding the pumps and utilizing the maximum capacity of the pump. The scaling controller output is fed to a dual channel time 32. The channels of the timer are used to turn a specific nutrient off during an irrigation cycle if such is desired. A nutrient that is to be time controlled is wired to the second channel. When an irrigation cycle is run with that specific nutrient to be eliminated from, for example, the greens on the course, the time is programmed on the second channel to stop the specific nutrient injection pump at the predetermined time which the greens are watered. Using the timer to start and stop different nutrients at different times gives the grounds keeper many combinations of nutrients and application areas. Connected to each channel are stroke counters 33, 34. These stroke counters record the pump strokes of each channel to enable the operator to calculate the amount of nutrient injected by each pump using the pump manufacturer's tables. The output of each timer channel is carried to the pumps by cable 35. This cable transmits the pump rate control to the pumps 5, 6, 7, and 8 to: start, run at a proportional rate to irrigation flow, and stop at the time the irrigation stops.

As we have just described the pumps 5–8 are controlled proportional to the flow rate of the irrigation water. This control applies an equal Part Per Million of nutrient to each gallon of water applied to the irrigated area.

NUTRIENT INJECTION OPERATION

As presented in FIG. 1, each nutrient has its individual storage tank, piping circuit, injection lance components, and injection pump. The operation of each is independent in operation. Only the common proportional rate control signal is fed into all the pumps 5–8. Thus all pumps 5–8 start, run at varying speeds, and stop together; except in special setups where one or more of the pumps 5–8 may be stopped, as described above, by the use of the timer 32.

The pumps 5–8 used are preferably positive displacement diaphragm injection pumps designed for injecting chemicals into pressurized lines. The operating pressure is always above the irrigation line pressure. The pumps have a stroking rate that is varied by a control input, which is transmitted from the scaling controller 31 through the timer circuit 32. The pumps have a stroke adjustment, which varies the injected volume of each stroke. This adjustment allows the pump to be set at different volumes of injection. This adjustment on each pump produces the different nutrient ratio combinations for the system. The pumps are connected to their own nutrient storage tanks 1, 2, 3, and 4 by way of piping circuits 9, 10, 11, and 12. Each tank is fitted with the proper fittings and valves to meet industry standards. The discharge or output of the pumps are connected to discharge lines 13, 14, 15, and 16 which adds the pressurized nutrient to the injection lances. The injection lances are fitted with check valves to prevent back flow of water into the nutrient system. The injection of the liquid nutrients, which are water soluble, mixes with the flowing irrigation water very rapidly in the turbulent irrigation line.

The preceding description of the invention, containing flow rate controlled individual nutrient injection pumps, allows specific nutrient ratios to be applied by adjusting the injection volumes of each pump. This allows the stock nutrient stored in the tanks, nitrogen, phosphorus, potassium and micro-nutrient to be applied in any combination or combinations to the golf course or similar area to be treated with nutrients.

I claim:

1. An automatic feeding system for applying multiple nutrients to soil through an irrigation system comprised of an irrigation pipeline connected to a source of irrigation fluid, the automatic feeding system comprising:

a flow sensor connected to the pipeline having a mechanism adapted to measure the irrigation fluid flow rate in the pipeline and to produce an irrigation flow rate signal based on said fluid flow rate;

a plurality of injection units wherein each unit is comprised of
   a nutrient container;
   a conduit connecting the container to the pipeline;
   an injection pump located on the conduit between the container and the pipeline; and
   an adjustment means for adjusting the injection pump output in accordance with the nutrient concentration; and a controller apparatus in communication with the flow sensor and the injection pumps, the apparatus adapted to communicate a pump signal to the injection pumps to pace pump output in accordance with the irrigation fluid flow rate signal; the adjustment means and the controller apparatus in combination maintaining a constant injected parts per million of nutrient as the irrigation fluid flow rate varies.

2. The feeding system of claim 1, wherein the pump signal controls injection pump stroke rate.

3. The feeding system of claim 1, wherein the controller apparatus further comprises a mechanism adapted for use in inhibiting the stroke of a pump.

4. The feeding system of claim 3, wherein the mechanism adapted for use in inhibiting the stroke of a pump further includes an input zone-timing signal and an output pump-off signal.

5. The feeding system of claim 4 that further comprises apparatus in communication with the pump signal and adapted to record the total number of strokes per pump over a period of time.

* * * * *